United States Patent
Puerto et al.

(10) Patent No.: US 9,856,412 B2
(45) Date of Patent: Jan. 2, 2018

(54) ULTRA-LOW-TENSION COMPOSITIONS AND THEIR USE IN ENHANCED OIL RECOVERY

(71) Applicants: Maura Puerto, Houston, TX (US); José Luis López Salinas, Houston, TX (US); Clarence A. Miller, Houston, TX (US); George Hirasaki, Bellaire, TX (US)

(72) Inventors: Maura Puerto, Houston, TX (US); José Luis López Salinas, Houston, TX (US); Clarence A. Miller, Houston, TX (US); George Hirasaki, Bellaire, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 128 days.

(21) Appl. No.: 14/664,324

(22) Filed: Mar. 20, 2015

(65) Prior Publication Data
US 2015/0267104 A1    Sep. 24, 2015

Related U.S. Application Data

(60) Provisional application No. 61/968,206, filed on Mar. 20, 2014.

(51) Int. Cl.
*C09K 8/584* (2006.01)
*E21B 43/16* (2006.01)

(52) U.S. Cl.
CPC .................................. *C09K 8/584* (2013.01)

(58) Field of Classification Search
None
See application file for complete search history.

(56) References Cited

U.S. PATENT DOCUMENTS

| | | | | |
|---|---|---|---|---|
| 5,566,760 A * | 10/1996 | Harris | ................... | E21B 43/267 166/308.6 |
| 2010/0282467 A1* | 11/2010 | Hutchison | ............. | C07C 303/06 166/305.1 |
| 2014/0073541 A1* | 3/2014 | Ravikiran | .............. | C09K 8/584 507/254 |
| 2014/0262297 A1* | 9/2014 | Huang | ................... | E21B 43/16 166/309 |

OTHER PUBLICATIONS

Lai, Kuo-Yann and Dixit, Nagaraj 1996 "Additives for foams," in *Foams*, R.K. Prud'homme and S.A. Khan (ed.), Marcel Dekker, New York, Ch.8.

* cited by examiner

*Primary Examiner* — John J Figueroa
(74) *Attorney, Agent, or Firm* — Winstead PC

(57) ABSTRACT

In some embodiments, the present disclosure pertains to compositions for enhanced oil recovery. In some embodiments, such compositions include: (1) a first agent, wherein the first agent acts as a foam booster; (2) a second agent, wherein the second agent includes a sulfonated or sulfated anionic surfactant; a (3) a third agent, wherein the third agent includes an alkoxylated and anionic surfactant; and (4) a base liquid. In some embodiments, the compositions of the present disclosure further include a gas, such as nitrogen. Further embodiments of the present disclosure pertain to methods of formulating the aforementioned compositions for enhanced oil recovery. Additional embodiments of the present disclosure pertain to methods of recovering oil from a reservoir by utilizing the aforementioned compositions.

9 Claims, 12 Drawing Sheets

ULTRA-LOW-TENSION COMPOSITIONS AND THEIR USE IN ENHANCED OIL RECOVERY

CROSS-REFERENCE TO RELATED APPLICATIONS

This application claims priority to U.S. Provisional Patent Application No. 61/968,206, filed on Mar. 20, 2014. The entirety of the aforementioned application is incorporated herein by reference.

STATEMENT REGARDING FEDERALLY SPONSORED RESEARCH

Not applicable.

BACKGROUND

Current methods of recovering oil from subterranean formations have numerous limitations in terms of efficiency, reproducibility, and efficacy. Such limitations are further escalated when oil recovery occurs in reservoirs that have been substantially depleted of oil. The present disclosure addresses these limitations.

SUMMARY

In some embodiments, the present disclosure pertains to compositions for enhanced oil recovery. In some embodiments, such compositions include: (1) a first agent, where the first agent acts as a foam booster; (2) a second agent, where the second agent includes a sulfonated or sulfated anionic surfactant; (3) a third agent, where the third agent includes an alkoxylated and anionic surfactant; and (4) a base liquid. In some embodiments, the compositions of the present disclosure further include a gas, such as nitrogen.

Further embodiments of the present disclosure pertain to methods of formulating the aforementioned compositions for enhanced oil recovery. In some embodiments, such methods include: (1) combining a first agent with a second agent in a base liquid at a ratio to form a mixture; and (2) adding a third agent to the mixture.

In some embodiments, the ratio is chosen such that the mixture reaches an oil-to-water phase inversion point. In some embodiments, the ratio is chosen such that the mixture forms a middle-phase micro-emulsion. In some embodiments, the ratio is chosen such that there is a lowering of a capillary force of the mixture. In some embodiments, the ratio is chosen such that there is a lowering of interfacial tension.

In some embodiments, the addition of the third agent eliminates any precipitates from the mixture. In some embodiments, the addition of the third agent turns the mixture into a uniform and single phase. In some embodiments, the third agent is added to the mixture prior to introducing the mixture into a reservoir. In some embodiments, the third agent is added during or after introducing the mixture into a reservoir.

In some embodiments, the methods of the present disclosure also include a step of adding a gas to the mixture. In some embodiments, the gas is added to the mixture prior to introducing the mixture into a reservoir. In some embodiments, the gas is added during or after introducing the mixture into a reservoir. In some embodiments, the gas is nitrogen.

Further embodiments of the present disclosure pertain to methods of recovering oil from a reservoir by utilizing the aforementioned compositions. In some embodiments, such methods include: (1) adding one of the aforementioned compositions to the reservoir; and (2) recovering the oil from the reservoir.

DESCRIPTION OF THE FIGURES

(FIG. 2). However, such samples could not be delivered as shown in the picture because the surfactants are incompatible with brine in the absence of oil.

(FIG. 2) could not be delivered because the surfactants are incompatible with brine in the absence of oil.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Current methods of recovering oil from subterranean formations have numerous limitations in terms of efficiency, reproducibility, and efficacy. Such limitations are further escalated when oil recovery occurs in reservoirs that have been substantially depleted of oil. Therefore, a need exists for more effective systems and methods for enhanced oil recovery. Various aspects of the present disclosure address this need.

In some embodiments, the present disclosure pertains to compositions for enhanced oil recovery. In some embodiments, the present disclosure pertains to methods of formulating such compositions. In some embodiments, the present disclosure pertains to methods of utilizing such compositions for enhanced oil recovery.

Figure 1:
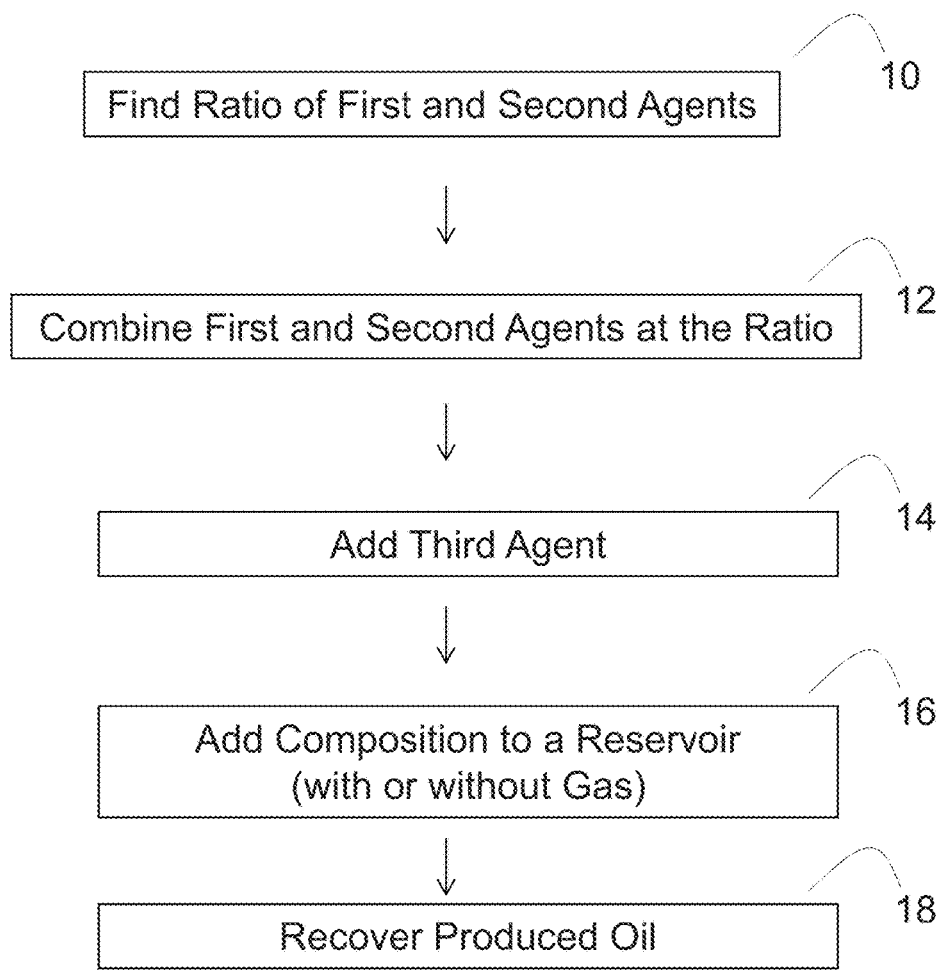
FIG. 1 provides a scheme for formulating a composition and utilizing the composition for enhanced oil recovery.

In some embodiments illustrated in FIG. 1, the present disclosure pertains to methods of formulating compositions for enhanced oil recovery by finding a ratio of first and second agents (step 10); combining the first and second agents at the ratio (step 12); and adding a third agent (step 14) to form the composition. In further embodiments illustrated in FIG. 1, the present disclosure pertains to methods for utilizing the compositions of the present disclosure for enhanced oil recovery by adding the composition to a reservoir (e.g., with or without gas) such that the composition displaces oil (step 16); and recovering the produced oil from the reservoir (step 18). In additional embodiments, the present disclosure pertains to formed compositions for enhanced oil recovery.

Compositions for Enhanced Oil Recovery

In some embodiments, the present disclosure pertains to compositions for use in enhanced oil recovery. In some embodiments, the compositions of the present disclosure include: (1) a first agent, where the first agent acts as a foam booster; (2) a second agent, where the second agent includes, for example, a sulfonated or sulfated anionic surfactant; (3) a third agent that includes an alkoxylated, anionic surfactant; and (4) a base liquid. In some embodiments, the compositions of the present disclosure may also be associated with a gas. As set forth in more detail herein, various agents, base liquids, and gases may be utilized in the compositions of the present disclosure. Moreover, the compositions of the present disclosure can have various properties.

First Agents

In general, first agents refer to active agents (e.g., surface active agents) that can serve as foam boosters in the compositions of the present disclosure. Foam boosters generally refer to materials that can facilitate the formation of foam.

Various types of first agents can be used in the compositions of the present disclosure. Non-limiting examples include, without limitation, small solid particles, polymers, and surfactants. In some embodiments, the first agent includes one or more surfactants. In some embodiments, the first agent includes, without limitation, alkanol amides, sultaines, betaines, amine oxides, zwitterionic surfactants, anionic surfactants, cationic surfactants, nonionic surfactants, alkyl ammonium chlorides, alcohols, fatty acids, and combinations thereof.

In some embodiments, the first agent of the present disclosure includes alcohols, fatty acids, and combinations thereof. In some embodiments, the alcohols and fatty acids include hydrocarbon chains. In some embodiments, the hydrocarbon chains are comparable to the hydrocarbon chains of anionic surfactants, alkanol amides, betaines, amine oxides, and sultaines.

In some embodiments, the first agent of the present disclosure includes one or more zwitterionic surfactants. In some embodiments, the zwitterionic surfactants have head groups that exhibit a dipole while exhibiting no net charge at neutral or high pH.

In some embodiments, the first agent of the present disclosure includes one or more betaines and amine oxides. In some embodiments, the one or more betaines and amine oxides are protonated and become cationic at low pH. See Lai, Kuo-Yann and Dixit, Nagaraj, 1996, "Additives for foams," in *Foams*, R. K. Prud'homme and S. A. Khan (ed.), Marcel Dekker, New York, Ch. 8.

In some embodiments where the first agent is anionic, electrostatic repulsion among adjacent negatively charged head groups may limit the number of surfactant molecules per unit area in the monolayers at the surfaces of the compositions of the present disclosure. In such embodiments, addition of nonionic, cationic, or zwitterionic first agents (i.e., foam boosters) can increase the number of surfactant molecules per unit area, thereby increasing attractive interaction among the hydrocarbon chains of the molecules in the composition, and strengthening the foams in the composition. In some embodiments, head groups of various cationic and zwitterionic surfactants may have attractive interaction with anionic head groups, thereby providing a further strengthening effect.

The compositions of the present disclosure can have various amounts of first agents. For instance, in some embodiments, the compositions of the present disclosure have from about 0.1% to about 10% by weight of first agents. In some embodiments, the compositions of the present disclosure have from about 0.1% to about 1% by weight of first agents. In some embodiments, the compositions of the present disclosure have from about 0.4% to about 0.6% by weight of first agents. In some embodiments, the compositions of the present disclosure have about 0.5% by weight of first agents.

Second Agents

Various second agents may also be used in the compositions of the present disclosure. In some embodiments, the second agent is a surface active agent. In some embodiments, the second agent includes a sulfonated or sulfated anionic surfactant. In some embodiments, the second agent includes a sulfonated anionic surfactant. In some embodiments, the second agent includes a sulfated anionic surfactant. In more specific embodiments, the second agent includes, without limitation, alkyl sulfonated surfactants, alkyl sulfated surfactants, alpha olefin sulfonated surfactants, internal olefin sulfonated surfactants, alkyl alkoxylated sulfonated surfactants, alkyl alkoxylated sulfated surfactants, and combinations thereof. In some embodiments, the second agent includes an internal or alpha olefin sulfonate.

The compositions of the present disclosure can have various amounts of second agents. For instance, in some embodiments, the compositions of the present disclosure have from about 0.1% to about 10% by weight of second agents. In some embodiments, the compositions of the present disclosure have from about 0.1% to about 1% by weight of second agents. In some embodiments, the compositions of the present disclosure have from about 0.4% to about 0.6% by weight of second agents. In some embodiments, the compositions of the present disclosure have about 0.5% by weight of second agents.

Third Agents

Various third agents may also be used in the compositions of the present disclosure. In some embodiments, the third agent is a surface active agent. In some embodiments, the third agents include an alkoxylated and anionic surfactant. In some embodiments, the third agent is an alkoxylated and carboxylated alcohol. In some embodiments, the alkoxylated and carboxylated alcohol is linear or branched.

In some embodiments, the third agent is an alkyl alkoxylated carboxylated surfactant. In some embodiments, the alkoxylated component of the alkyl alkoxylated carboxylated surfactant includes, without limitation, propoxylated moieties, ethoxylated moieties, and combinations thereof. In some embodiments, the alkoxylated component of the alkyl alkoxylated carboxylated surfactant moieties include, without limitation, moieties propoxylated and then ethoxylated, moieties ethoxylated and then propoxylated, randomly propoxylated and ethoxylated moieties, and combinations thereof.

The third agents of the present disclosure can serve various functions. For instance, in some embodiments, the third agent prevents or eliminates any precipitation in the compositions of the present disclosure. In some embodiments, the third agent prevents or eliminates precipitates from forming at various temperatures (e.g., from ambient temperatures to temperatures over 100° C.) while preserving foamability and low tension in the compositions of the present disclosure.

The compositions of the present disclosure can have various amounts of third agents. For instance, in some embodiments, the compositions of the present disclosure have from about 0.1% to about 10% by weight of third agents. In some embodiments, the compositions of the present disclosure have from about 0.1% to about 1% by weight of third agents. In some embodiments, the compositions of the present disclosure have from about 0.2% to about 0.8% by weight of third agents. In some embodiments, the compositions of the present disclosure have about 0.3% by weight of third agents.

Base Liquid

The compositions of the present disclosure may also have various base liquids. In some embodiments, the compositions of the present disclosure have base liquids that include salt waters, brines, and compositions thereof. In some embodiments, the base liquid is a hard brine. In some embodiments, the base liquid is a saltwater brine. In some embodiments, the base liquid is a brine with more than about 5% of dissolved salts. In some embodiments, the dissolved salts include, without limitation, NaCl, KCl, $CaCl_2$, $CaSO_4$, $MgCl_2$, $MgSO_4$, $Na_2SO_4$, and combinations thereof.

Gases

The compositions of the present disclosure may also contain one or more gases. In some embodiments, the gas includes, without limitation, natural gases, nitrogen, carbon dioxide, and combinations thereof. In some embodiments, the gas is nitrogen. In some embodiments, the gas is carbon dioxide. In some embodiments, the gas is a combination of nitrogen and carbon dioxide. In some embodiments, the compositions of the present disclosure do not contain gases. In more specific embodiments, the compositions of the present disclosure include three surfactants in hard brine that is gassed with nitrogen.

Properties

The compositions of the present disclosure can have various properties. For instance, in some embodiments, the compositions of the present disclosure may be in the form of foams. In some embodiments, the compositions of the present disclosure are uniform. In preferred embodiments, the compositions of the present disclosure remain in one phase from ambient temperature to a temperature in the reservoir (e.g., temperatures varying from ambient temperature to over 100° C.).

In some embodiments, the compositions of the present disclosure have low interfacial tension. For instance, in some embodiments, the compositions of the present disclosure have an interfacial tension that ranges from about 0.0001 Dynes/cm to about 1 Dynes/cm. In some embodiments, the compositions of the present disclosure have an interfacial tension that ranges from about 0.0001 Dynes/cm to about 0.5 Dynes/cm. In some embodiments, the compositions of the present disclosure have an interfacial tension that ranges from about 0.0001 Dynes/cm to about 0.001 Dynes/cm. In some embodiments, the compositions of the present disclosure have an interfacial tension that ranges from about 0.002 Dynes/cm to about 0.03 Dynes/cm. In some embodiments, the compositions of the present disclosure have an interfacial tension that ranges from about 0.02 Dynes/cm to about 0.2 Dynes/cm. In some embodiments, the compositions of the present disclosure have an interfacial tension that ranges from about 0.2 Dynes/cm to about 0.5 Dynes/cm.

In some embodiments, the compositions of the present disclosure have low viscosity. For instance, in some embodiments, the compositions of the present disclosure have a viscosity that ranges from about 0.5 centipose to about 2 centipose. In some embodiments, the compositions of the present disclosure have a viscosity that ranges from about 0.5 centipose to about 1 centipose. In some embodiments, the compositions of the present disclosure have a viscosity that is less than about 1 centipose. In some embodiments, the compositions of the present disclosure have a viscosity of about 1 centipose at about 25° C. In some embodiments, the compositions of the present disclosure have a viscosity of less than about 1 centipose at about 100° C.

Methods of Formulating Compositions for Enhanced Oil Recovery

In additional embodiments, the present disclosure pertains to methods of formulating compositions for enhanced oil recovery. In some embodiments, such methods include: (1) combining a first agent with a second agent in a base liquid at a certain ratio to form a mixture; and (2) adding a third agent to the mixture. In further embodiments, the methods of the present disclosure also include a step of adding a gas to the mixture. Suitable first, second and third agents were described previously. Suitable gases were also described previously.

As set forth in more detail herein, various methods and approaches may be utilized to combine the first and second agents at various ratios. In addition, various methods and approaches may be utilized to add a third agent to the mixture. Various methods may also be utilized to add a gas to the mixture.

Combine First and Second Agents at a Ratio

Various methods may be utilized to combine first and second agents. For instance, in some embodiments, the combining occurs by methods that include, without limitation, mixing, stirring, sonicating, heating, and combinations thereof. In some embodiments, the combining occurs by mixing.

The first and second agents of the present disclosure may be combined at various ratios. Additional embodiments of the present disclosure include a step of finding a ratio of the first and second agents to be combined. Various methods may be utilized to find the ratio of the first and second agents to be combined. In some embodiments, the ratio is chosen such that the mixture reaches an oil-to-water phase inversion point. In some embodiments, the ratio is chosen such that the mixture forms a middle-phase micro-emulsion. In some embodiments, the ratio is chosen such that there is a lowering of a capillary force in the mixture. In some embodiments, the ratio is chosen such that there is a lowering of interfacial tension in the mixture.

In some embodiments, the ratio is a weight ratio of the first and second agents. In some embodiments, the ratio is a weight ratio of 2:1 with respect to the first and second agents.

Addition of Third Agent to Mixture

Various methods may also be utilized to add a third agent to a mixture. For instance, in some embodiments, the addition occurs by dropwise addition. In some embodiments, the addition may include, without limitation, mixing, stirring, sonicating, heating, and combinations thereof. In some embodiments, the addition occurs by mixing.

The third agent may be added to a mixture at various stages. For instance, in some embodiments, the third agent is added to the mixture prior to introducing the mixture into a reservoir. In some embodiments, the third agent is added to the mixture during or after introducing the mixture into a reservoir. In some embodiments, the third agent may be added while the first and second agents are being combined.

The third agents of the present disclosure may also have various effects on a mixture. For instance, in some embodiments, the addition of the third agent prevents or eliminates any precipitates from the mixture. In some embodiments, the addition of the third agent turns the mixture into a uniform and homogenous mixture that is in a single phase.

Addition of Gas to Mixture

In some embodiments, the methods of the present disclosure further include a step of adding a gas to a mixture. Various methods may be utilized to add a gas to a mixture. For instance, in some embodiments, the addition occurs by incubation of a mixture with a gas. In some embodiments, the addition occurs by injection of a mixture with a gas.

A gas may be added to a mixture at various stages. For instance, in some embodiments, a gas is added to a mixture prior to introducing the mixture into a reservoir. In some embodiments, a gas is added to a mixture during or after introducing the mixture into a reservoir. In some embodiments, a gas may be added to a mixture while the first and second agents are being combined. In some embodiments, a gas may be added to a mixture while the third agent is being added to a mixture.

In some embodiments, the gas includes, without limitation, natural gases, nitrogen, carbon dioxide, and combinations thereof. In some embodiments, the gas includes carbon dioxide.

Additional methods of formulating compositions for enhanced oil recovery can also be envisioned. For instance, additional examples of methods of formulating compositions for enhanced oil recovery are set forth in Examples 1-3.

Methods of Enhanced Oil Recovery

In additional embodiments, the methods of the present disclosure pertain to methods of recovering oil from a reservoir. In some embodiments, such methods include: (1) adding one or more of the compositions of the present disclosure to the reservoir, where the composition displaces the oil in the reservoir; and (2) recovering the oil from the reservoir. As set forth in more detail herein, various methods may be utilized to add the compositions of the present disclosure to various types of reservoirs. In addition, various methods may be utilized to recover oil from the reservoir.

Reservoirs

The methods of the present disclosure may be utilized to recover oil from various reservoirs. For instance, in some embodiments, the reservoir may be part of a geological structure. In some embodiments, the geological structure may include a downhole environment, such as an oil well or a subterranean formation. In some embodiments, the geological structure may be associated with various types of rocks, such as sandstone, dolomite, calcite, neutral formations, cationic formations, anionic formations, clays, shale, and combinations thereof.

In some embodiments, the reservoir may be a sub-surface formation, such as a well. In some embodiments, the reservoir may be penetrated by at least one vertical well. In some embodiments, the reservoir may be penetrated by at least one horizontal well.

In some embodiments, the reservoir from which oil is to be recovered may be an oil reservoir that has already been substantially depleted of oil. In some embodiments, the reservoir may be a fractured reservoir that contains trapped oil in matrices of the fractured reservoir. Thus, in some embodiments, the methods of the present disclosure may be used as part of a tertiary oil recovery process.

Addition of Compositions to Reservoirs

Various methods may be utilized to add the compositions of the present disclosure to reservoirs. In some embodiments, the compositions of the present disclosure may be added to a reservoir by injection. In some embodiments, the injection may occur by pumping the compositions of the present disclosure into the reservoir. In some embodiments, the pumping occurs by the utilization of a pump. In some embodiments, the injection may occur by physically pouring the compositions of the present disclosure into a reservoir.

In some embodiments, the compositions of the present disclosure are added to a reservoir by itself followed by gas. In some embodiments, the compositions of the present disclosure are added simultaneously to a reservoir with gas by co-injection. In some embodiments, the compositions of the present disclosure are added to a reservoir without any gases or foam formation.

In some embodiments, the compositions of the present disclosure can be added to reservoirs without gassing or making foam. In some embodiments, the compositions of the present disclosure can be added into a reservoir by the same methods utilized to recover oil trapped by capillary forces.

Recovery of Oil from the Reservoir

Various methods may also be utilized to recover oil from reservoirs. Without being bound by theory, it is envisioned that oil can be recovered from reservoirs after the compositions of the present disclosure displace the oil in the reservoir. Without being bound by further theory, it is envisioned that displacement occurs by the lowering of water-oil interfacial tension by the compositions of the present disclosure. For instance, in some embodiments, the water-oil interfacial tension is lowered by more than about 10%. In some embodiments, the water-oil interfacial tension is lowered by about 10% to about 50%. In some embodiments, the water-oil interfacial tension is lowered by about 100% to about 10000%.

In some embodiments, the water-oil interfacial tension is lowered from a high value to a low value. In some embodiments, the high value ranges from about 50 Dynes/cm to about 5 Dynes/cm. In some embodiments, the low value ranges from about 1 Dynes/cm to about 0.001 Dynes/cm. In some embodiments, the water-oil interfacial tension is lowered from about 30 Dynes/cm to about 0.003 Dynes/cm.

In some embodiments, foams in the compositions of the present disclosure can facilitate the displacement of oil in the reservoir. In some embodiments, the oil is recovered by drawing out the oil from a reservoir. In some embodiments, the drawing out occurs by the use of a pump. In some embodiments, the oil is recovered manually by recovering the oil as it flows out of a reservoir.

In some embodiments, the compositions of the present disclosure are injected into a first location of a geological structure and collected from a second location of the geological structure. For instance, in some embodiments, the first location is an injection well, and the second location is a production well. In some embodiments, the injecting and the collecting occur from a single location (e.g., a wellbore) in a geological structure.

Applications and Advantages

In some embodiments, the present disclosure relates to processes which utilize foams generated from the compositions of the present disclosure as: (1) mobility control elements that improve the efficiency by which the compositions sweep a reservoir, and (2) carriers for the compositions as they contact and recover oil from a reservoir by lowering interfacial tension in the reservoir.

In some embodiments, the present disclosure provides methods of achieving both an ultralow interfacial tension with oil and making strong foams for recovering trapped oil from subsurface formations by virtually eliminating capillary forces in a reservoir, which cause the oil to be trapped in the reservoir matrix. In some embodiments, the methods of the present disclosure provide simultaneous fluid mobility control of a composition while foam is being generated.

In some embodiments, the methods of the present disclosure include introducing into a reservoir a composition of the present disclosure (e.g., a tailored surfactant formulation) that is capable of generating foam and lowering the water-oil interfacial tension. In some embodiments, the foam remains in the injected zone for a long period of time while allowing enough residence time for the low-tension liquid in the foam lamellae to penetrate the matrix and mobilize the trapped oil.

As such, the methods and compositions of the present disclosure are expected to provide numerous advantages and applications. For instance, in some embodiments, the methods and compositions of the present disclosure are expected to be of use in fractured reservoirs where the oil is trapped in the matrix of the fractured reservoir. In such application, the compositions of the present disclosure can fill the fractures and displace trapped oil. In some embodiments, the displacement occurs by lowering oil interfacial tension through the delivery of the compositions of the present disclosure. Generated foams can then allow enough residence time for the foam lamellae of the compositions to penetrate the matrix and mobilize the trapped oil.

In further embodiments, the compositions of the present disclosure can be used in conventional low-tension oil recovery processes in consolidated and unconsolidated porous media. In further embodiments, the compositions of the present disclosure can be used in commercial operations where surfactant solutions are used to remove soils from solid materials.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Formulation of Compositions for Enhanced Oil Recovery

This Example provides a general method of formulating compositions for enhanced oil recovery. In particular, this Example sets forth steps in formulating the compositions of the present disclosure when the agents are surfactants.

First, an optimum ratio of two surfactants is chosen such that the blend simultaneously produces low interfacial tension (IFT) and a strong foam. Next, a blend scan test is conducted with the two surfactants (e.g., a non-alkoxylated sulfonate and a betaine) with different Hydrophilic Lipophilic Balance (HLB) values (HLB of a surfactant is a measure of the degree to which it is hydrophilic (e.g., water soluble) or lipophilic (e.g., oil soluble)).

A blend scan test consists of a surfactant-phase-behavior test where only the HLB is varied by mixing surfactants at different ratios and fixing all other test parameters, such as: (a) total surfactant concentration; (b) temperature; (c) brine composition; (d) oil composition; and (e) brine:oil ratio (e.g., ~1). The surfactant ratios are varied at 10% intervals. When more definition is desired, the interval could be varied within 1%.

After samples are well mixed, they are allowed to quiescence and equilibrate. This refers to a system that is in thermodynamic equilibrium and remains unchanged when it is isolated from its surroundings. Next, at a test temperature, the optimal blend (Bø) is selected based on either: (a) phase inversion of oil/water microemulsion type (O/W) to water/oil microemulsion type (W/O) induced by changes in HLB; or (b) the formation of a middle-phase microemulsion of balanced HLB in equilibrium with excess of brine and oil. In O/W microemulsions, surfactants are generally more soluble in water than in oil (high HLB surfactants). In W/O microemulsions, surfactants are generally more soluble in oil than in water (low HLB surfactants).

Next, a blend scan test is conducted by utilizing only brine with the same surfactants (as described previously) in the absence of oil by varying surfactant ratio and fixing other test parameters, including: (a) total surfactant concentration; (b) temperature; and (c) brine composition. The surfactant ratios are varied at 10% intervals. When more definition is desired, intervals could be varied within 1%.

Thereafter, blend scan test results from samples prepared in the presence of oil are compared with samples prepared in the absence of oil. Next, a third surfactant is selected for eliminating precipitates from ambient temperatures (e.g., for delivering formulations economically since it does not need to be heated) to over 100° C. (e.g., for meeting temperature in the oil formation) while preserving foamability and low tension in the blend of surfactants selected from the aforementioned phase behavior test results. In some embodiments, the surfactant HLB must decrease with temperature. In other words, the third surfactant must be more hydrophilic at ambient temperatures than at elevated temperatures in some embodiments. Applicants expect the alkoxylated surfactants to meet this criterion.

Finally, enough of the third surfactant is added to the non-uniform composition made of brine with the optimum surfactant blend (as described above) until it becomes a single phase of a uniform composition that can be delivered without qualms into a subterranean formation.

Example 2. Formulation and Use of Compositions in Enhanced Oil Recovery

This Example provides a general method of formulating compositions for enhanced oil recovery and utilizing the compositions in a conventional tertiary oil recovery process. As in Example 1, this Example also sets forth steps in formulating the compositions of the present disclosure when the agents are surfactants.

First, an optimum surfactant ratio is selected from blending two surfactants to generate ultra-low IFT. Next, a blend scan test is conducted with two surfactants of different HLBs. The HLB is varied by mixing surfactants at different ratios and fixing all other test parameters, including: (a) total surfactant concentration, (b) temperature, (c) brine composition, (d) oil composition, and (e) brine:oil ratio (i.e., ~1). The surfactant ratios are varied at 10% intervals. When more definition is desired, intervals could be varied within 1%.

After the samples are well mixed and equilibrated at test temperatures, the optimal blend (Bø) is selected based on either: (a) phase inversion of O/W microemulsion type to W/O microemulsion type induced by changes in HLB; or (b) the formation of a middle-phase microemulsion of balanced HLB in equilibrium with excess of brine and oil.

Thereafter, a blend scan test is conducted by utilizing only brine with the same surfactants mentioned above in the absence of oil. The surfactant ratio is varied while the other test parameters are fixed, including: (a) total surfactant concentration; (b) temperature; and (c) brine composition. The surfactant ratios are varied at 10% intervals. When more definition is desired, the interval could be varied within 1%. Next, test results are compared from samples prepared in the presence of oil with those samples prepared in the absence of oil.

Applicants envision that the optimal blend of surfactants that will generate low interfacial tension may not form uniform solutions with the properties required to be successfully delivered into oil formations. In the absence of oil, optimal solutions may be non-uniform, either with precipitates or other undesirable characteristics that will hinder the enhanced oil recovery process (likely due to the potential of producing severe reduction in rock permeability, which is the state or quality of a material that causes it to allow liquids or gases to pass through it).

Therefore, a subsequent step is the selection of the third surfactant for eliminating precipitates from ambient temperatures (e.g., for delivering formulations economically since it does not need to be heated) to over 100° C. (e.g., for corresponding to temperature in the oil formation) while preserving low tension in the blend of surfactant selected from phase behavior test results described above.

In some embodiments, the surfactant HLB must decrease with temperature. In other words, the third surfactant must be more hydrophilic at ambient temperatures than at elevated temperatures. Applicants envision that alkoxylated surfactants meet this criterion.

Thereafter, sufficient amounts of the third surfactant are added to the non-uniform composition made of brine with optimum surfactant blend (as described above) until it becomes a single phase and uniform composition that can be effectively delivered into a reservoir (e.g., a subterranean formation).

Next, the composition is delivered to the reservoir (e.g., subterranean formation) by itself for as long as desired. For mobility control, the composition could be followed with foam as described previously.

In some embodiments, the low-tension foam can be either pre-generated or in situ generated. For instance, the blended surfactants in an aqueous carrier liquid such as salt water or brine can be foamed by the gas, which can be natural gas or nitrogen and introduced as a foam into the desired oil-bearing zone. Alternatively, the blended surfactants in an aqueous carrier can be introduced by itself first followed by gas, or introduced by co injection simultaneously with gas to in situ generate foam whereby trapped oil will be mobilized.

Example 3. Formulation of Compositions for Enhanced Oil Recovery

In this Example, a more detailed method of formulating compositions for enhanced oil recovery is illustrated. Screening tests were conducted to determine the optimum blend ratio for the brine composed of salts mimicking sea water with a composition of NaCl (2.7%), $CaCl_2$ (0.13%), $MgCl_2.6H_2O$ (1.12%), $Na_2SO_4$ (0.48%), and crude oil. The detailed procedure utilized in the screening tests is as follows.

Figure 2:
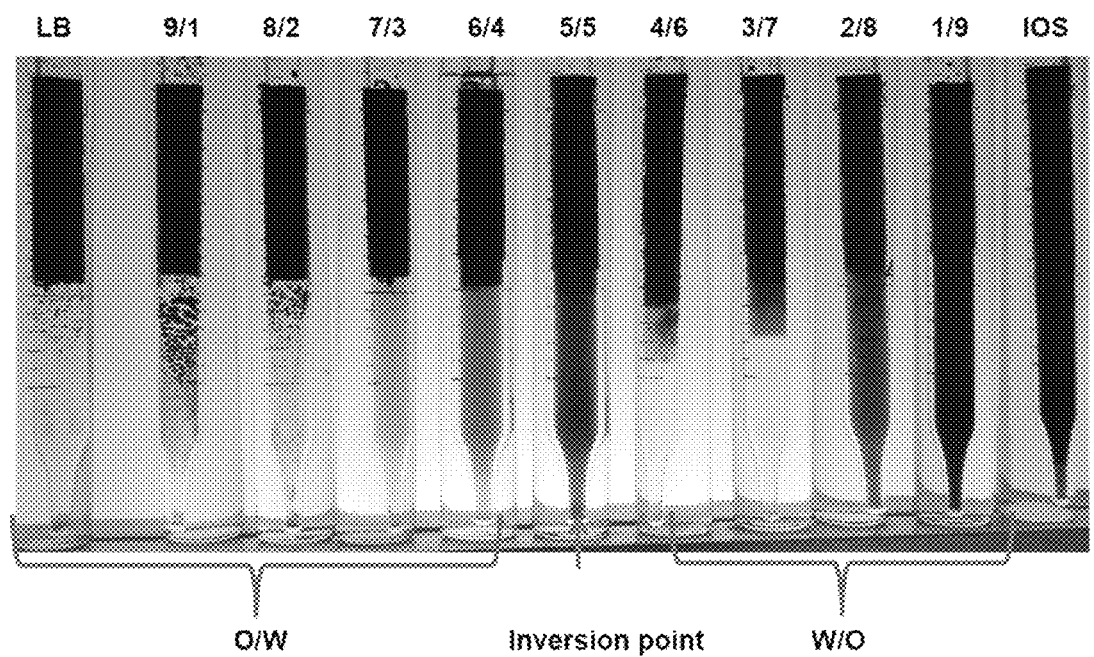
FIG. 2 provides scan test results of a 1% blend of samples made with Lauryl Betaine (LB) and Internal Olefin Sulfonate C15-18 (IOS) in about equal volumes of a brine made of sea water-like composition and crude oil at 100° C. Surfactant ratios, LB/IOS, were varied at 10% weight intervals. Samples with compositions near or at 5/5 LB/IOS generated ultra-low interfacial tension (IFT) needed for recovering oil trapped by capillarity.

Example 3.1. Blend Scan Test of Lauryl Betaine and Internal Olefin Sulfonate Surfactants with Oil The two surfactants tested in this example, Lauryl Betaine (LB) and Internal Olefin Sulfonate $C_{15-18}$ (IOS), were dissolved separately in distilled water at a concentration of 4% weight surfactant by volume in water. The resulting surfactant solutions were then placed by weighing a finite amount of each of them, into tip-sealed borosilicated pipettes, to obtain samples with different ratios at an overall 1% concentration after adding: (1) the same volume of brine with twice the salt concentration of sea water to compensate for the volume of distilled water introduced with surfactants; and (2) a volume of crude oil about equal the volume of aqueous surfactant solution. Thereafter, the filled pipettes were torch-sealed at the top. The pipettes were then mixed and equilibrated at 100° C. The test results are visually depicted in FIG. 2.

Example 3.2. Blend Scan Test of LB and IOS Surfactants without Oil

Figure 3:
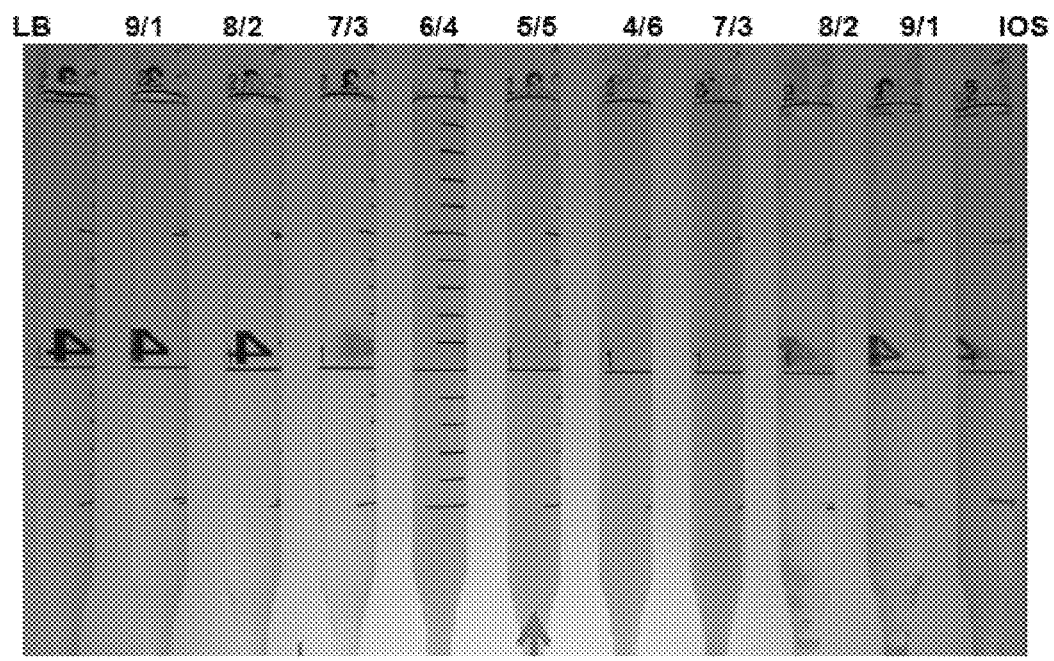
FIG. 3 provides scan test results of a 1% blend of samples made with Lauryl Betaine (LB) and Internal Olefin Sulfonate C15-18 (IOS) in a brine made of sea water-like composition at ~25° C. Surfactant ratios, LB/IOS, were varied at 10% weight intervals. Samples with compositions near or at 5/5 LB/IOS (indicated with an arrow) generated ultra-low IFT in the presence of oil at 100° C.
Figure 4:
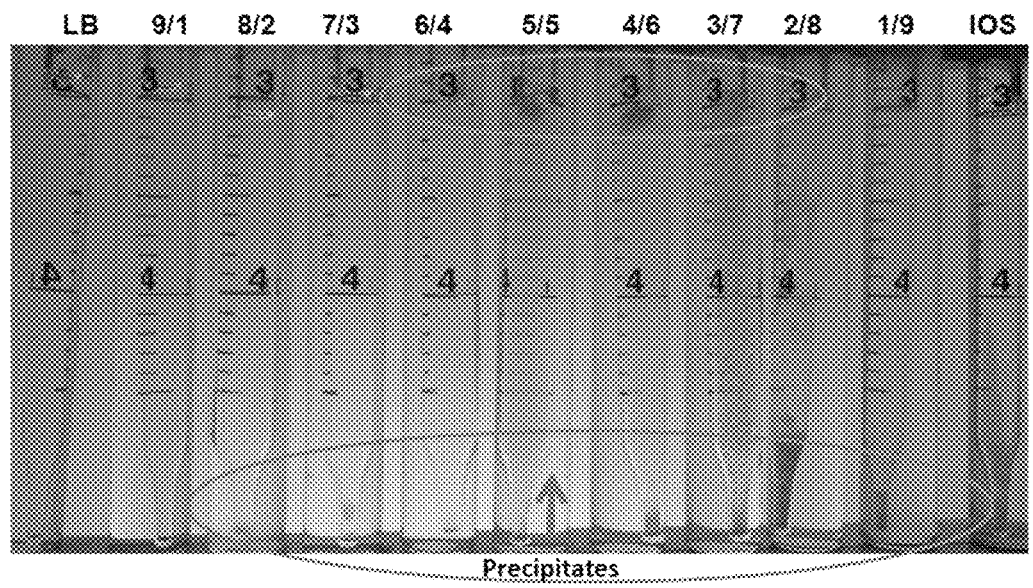
FIG. 4 shows scan test results of a 1% blend of samples made with Lauryl Betaine (LB) and Internal Olefin Sulfonate C15-18 (IOS) in a brine made of sea water-like composition at 100° C. Surfactant ratios, LB/IOS, were varied at 10% weight intervals. Samples with compositions near or at 5/5 LB/IOS that generated ultra-low IFT in the presence of oil at 100° C.

For a valid comparison of test results with and without oil, the same solutions of LB and IOS dissolved separately in distilled water at a concentration of 4% weight surfactant by volume in water were utilized. The surfactant solutions were placed by weighing a finite amount of each of them into tip-sealed borosilicated pipettes to obtain samples with different ratios at an overall 1% concentration after adding: (1) the same volume of brine with twice the salt concentration of seawater to compensate for the volume of distilled water introduced with surfactants; and (2) a volume sea water for diluting the sample to a 1% concentration. Thereafter, the filled pipettes were torch-sealed at the top. The pipettes were then mixed well and allowed to equilibrate at ~25° C. The test results are depicted in FIG. 3. Additional test results are depicted in FIG. 4.

Figure 5:
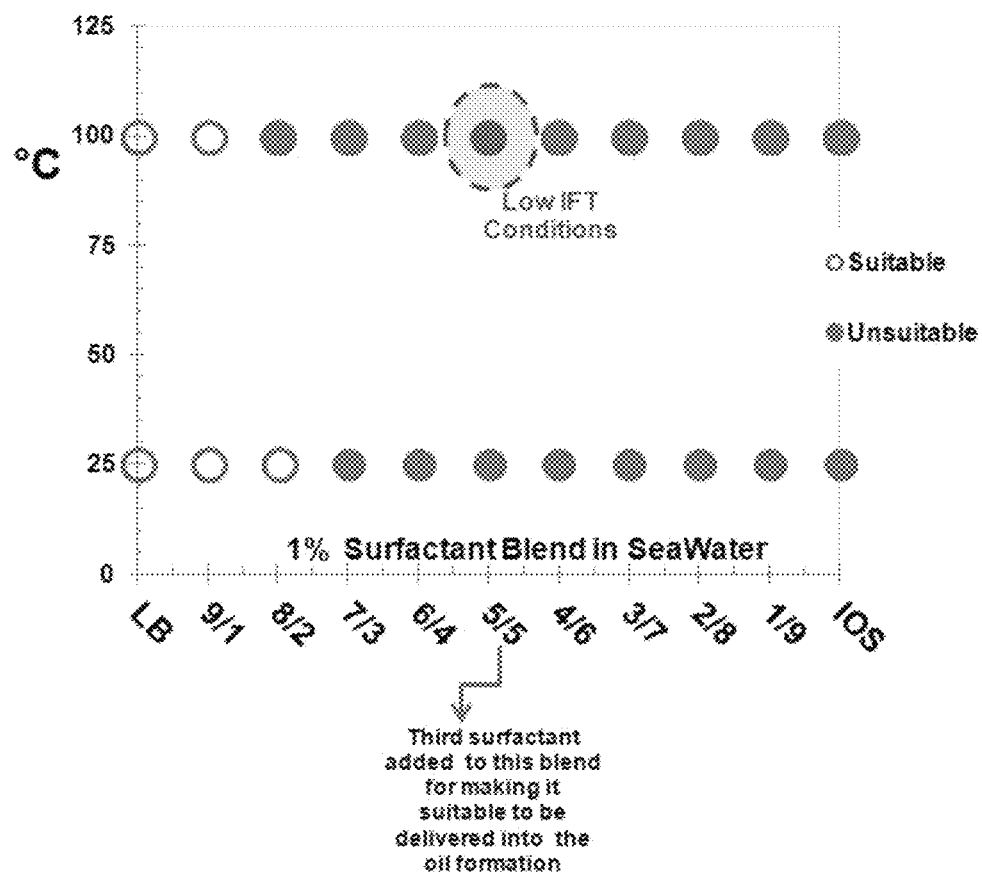
FIG. 5 provides a map of phase behavior test results to indicate how a specific blend ratio was selected to add a third surfactant. Adding the third surfactant converted the unsuitable formulation into a suitable one to be delivered into oil formations for generating simultaneously ultra-low IFT and strong foam.

The samples in FIG. 3 were remixed at 100° C. Thereafter, the phases were allowed to equilibrate at 100° C. For clarity, test results depicted in FIGS. 2-3 were plotted as data points in FIG. 5.

Example 3.3. Addition of the Third Surfactant

For eliminating precipitates while preserving foamability and low tension in the blend of 5/5:LB/IOS with potential to generate ultra-low IFT at elevated temperature (100° C.), Applicants envisioned that the third surfactant must have a hydrophilic to lipophilic balance (HLB) that decreases with temperature. In other words, Applicants envisioned that the third surfactant must be more hydrophilic at ambient temperatures than at elevated temperatures while being: (1) hydrophilic enough at both low and high temperature to promote surfactant-brine compatibility in the absence of oil; (2) hydrophobic enough at elevated temperature for not hindering the generation of ultra-low IFT; and (3) preferably thermally stable. In this example, the surfactant that has met these criteria is tridecyl alcohol. Tridecyl alcohol is about three times ethoxylated and carboxylated. Tridecyl alcohol's conventional name is L38.

The procedure utilized for determining the amount of L38 for making 1% 5:LB and 5:IOS suitable for delivery into oil formation was by titrating a known amount of such composition with as-received L38 until the composition was free of cloudiness/precipitates and then back calculating the total amount of surfactants that resulted in 1% (5:LB+5:IOS) and 0.12% of L38 in sea water. The IFT was estimated at 100° C. from emerging drops, leaving the oil-wet treated capillary filled with crude oil when immersed in 1% (5:LB+5:IOS) and 0.12% L38 in sea water.

Figure 6:
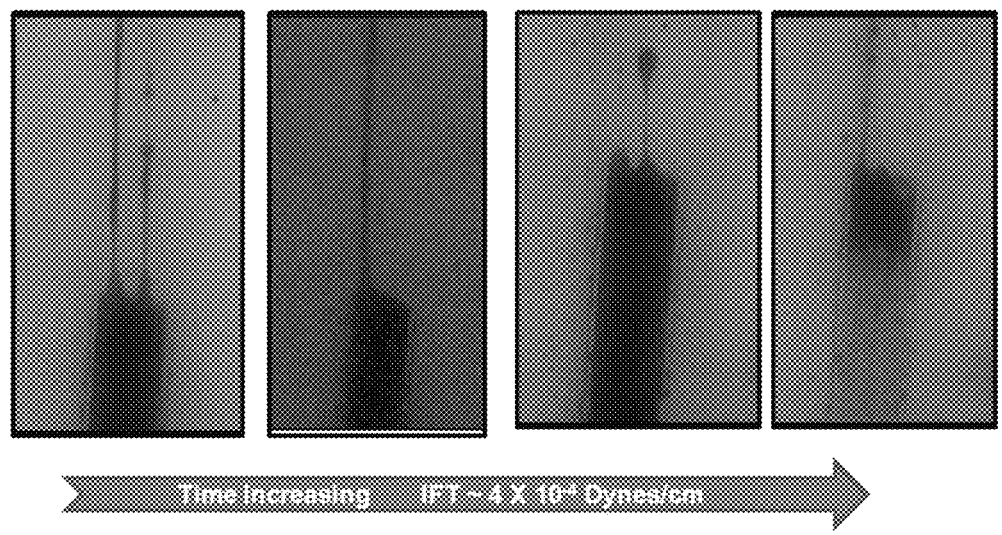
FIG. 6 provides snapshots while crude oil was being removed from an oil-treated capillary at 100° C. after being immersed in 1% (5:LB+5:IOS) and 0.12% L38 in sea water. Oil remained in capillary when it was immersed in sea water at 100° C.
Figure 7:
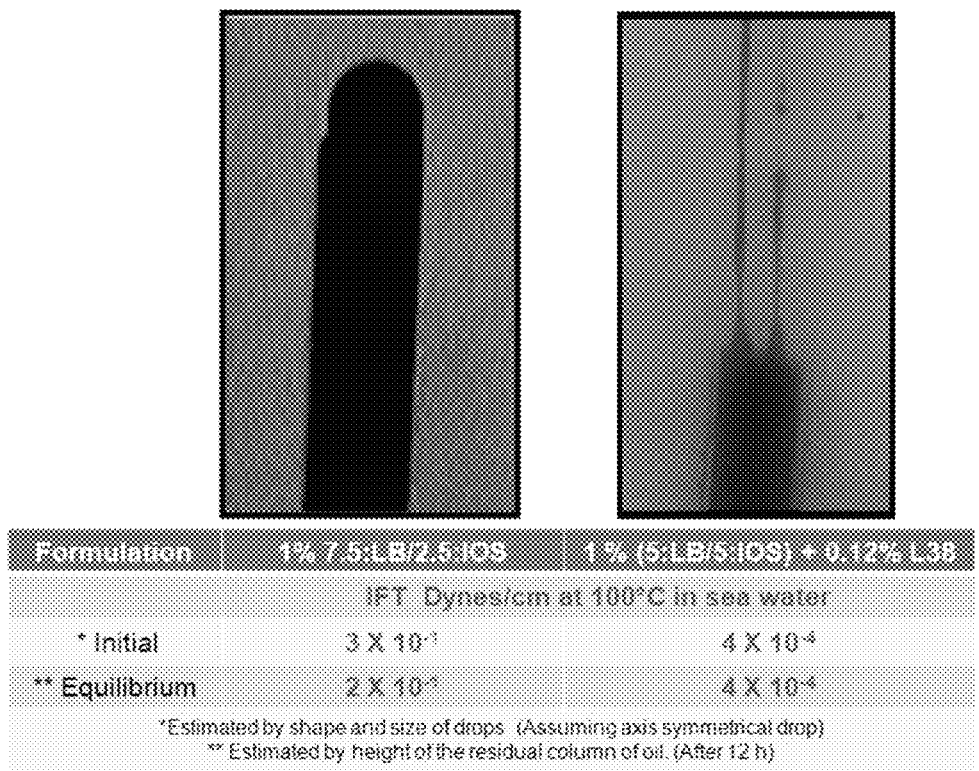
FIG. 7 provides a comparison of initial emerging-drop behaviors at 100° C. Formulation without L38 is several orders of magnitude higher.

The estimated final IFT value of $4 \times 10^{-4}$ Dynes/cm (depicted in FIG. 5) was compared to a corresponding formulation of 1% (7.5:LB/2.5:IOS) in FIG. 6. This formulation is without precipitate and generates strong foam at 100° C. However, the formulation fails to produce ultra-low IFT because the 7.5:LB/2.5:IOS is not near the inversion point (see FIG. 5) when tested in the presence of crude oil.

Figure 8:
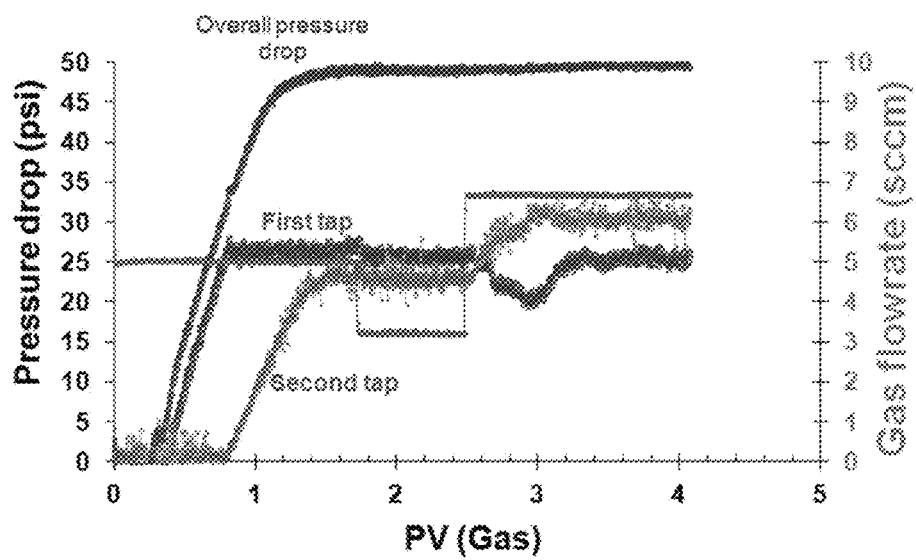
FIG. 8 provides data related to the co-injection of 0.5% LB with 0.5% $IOS_{15-18}$ and 0.12% L38. The foam quality is 80%. The materials used include OTTAWA Sand (K=45 Darcys in Seawater at 94° C.).

The modified composition of 1% (5:LB/5:IOS) and 0.12% L38 in sea water was flow tested to determine its foamability behavior by delivering it with gas simultaneously into a stainless steel sand holder packed with OTTAWA Silica sand as the porous media saturated with sea water at 94° C. (maximum for the oven used). The foamability behavior was assessed by calculating the apparent viscosity of the foam from the pressure drop caused by the viscous behavior of the foam flowing in porous media. Darcy's law is used to calculate the apparent viscosity of foam in porous media from test results, such as those shown in FIG. 8. Apparent viscosity serves to reveal the viscous behavior of foam in comparison to the gas and surfactant phases. Once steady state flow of foam through the sand pack was established, the apparent viscosity of the foam was calculated using Darcy's Law:

$$\text{Apparent Viscosity, } \mu_a = \frac{kA\Delta p}{qL}$$

In this formula, k is permeability in Darcys; A is area of sand holder in cm²; ΔP is the pressure across section in atmosphere; q is the flow rate (cc/second); and L is the length of the sand holder in cm.

Foams of 80% quality (F), as measured by the following formula, were studied:

$$\text{Quality, } \Gamma = \frac{\text{Gas Volume}}{\text{Gas Volume + Surfactant Solution Volume}}$$

Figure 9:
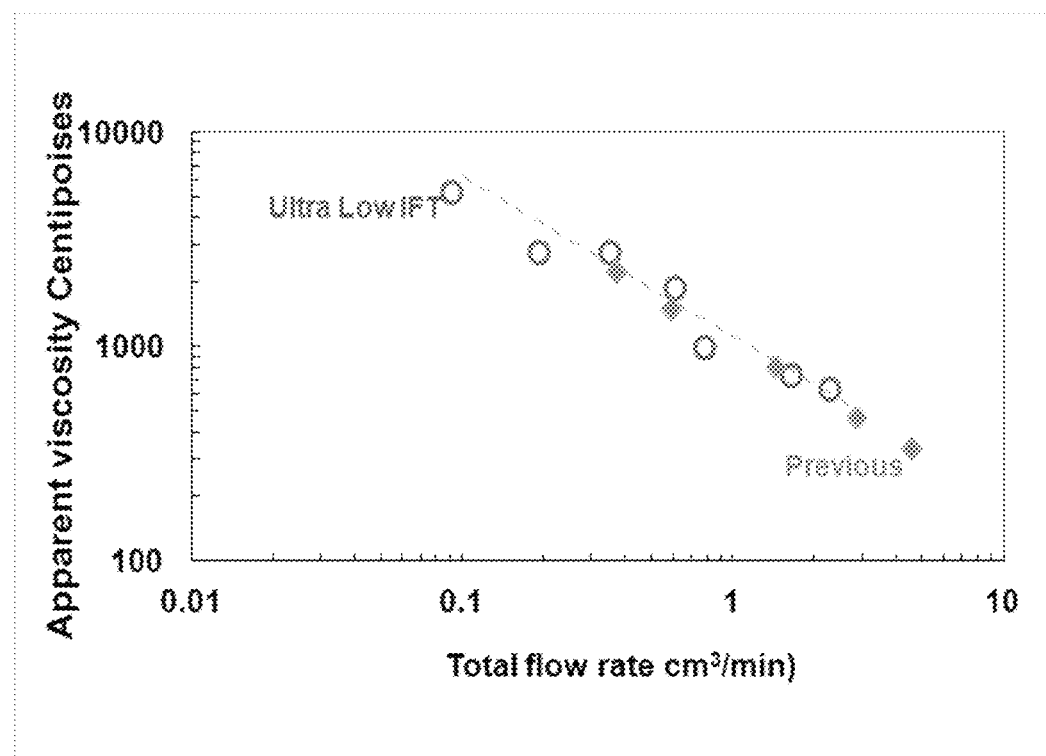
FIG. 9 provides data and images relating to the comparison of the ultra-low IFT formulation made of 1% (5:LB+5:IOS) and 0.12% L38 with a previous formulation made of 1% (7:LB+3:$AOS_{16-18}$).

The foams were studied by changing the rates of nitrogen and surfactant solutions being simultaneously introduced into the sand pack. Once steady state flow of foam through the sand pack was established, the test results were plotted in FIG. 9 to be compared with the behavior of a previous formulation that was recognized as able to generate strong foam without promoting ultra-low IFT.

Thus, the results indicate that the incorporation of a third surfactant has preserved the ultra-low oil IFT property of the two surfactant blends that otherwise were rendered unsuitable to be delivered into oil formations because the blend failed to be comparable with brine in the absence of oil.

Example 3.4. Addition of the Third Surfactant to Compositions

This example is another demonstration for eliminating precipitates while preserving foamability and low tension in the blend of 5/5:LB/IOS with potential to generate ultra-low IFT at elevated temperatures (100° C.). In this example, the third surfactant added is tridecyl alcohol. Tridecyl alcohol is five times propoxylated and eight times ethoxylated and carboxylated. Tridecyl alcohol is also referred to as N58.

The procedure utilized for determining the amount of N58 for making 1% (5:LB/5:IOS) suitable for delivery into oil formation was by titrating a known amount of such composition with N58 until the composition was free of cloudiness or precipitates and then back calculating the total amount of surfactants. In this example, the 1% (5:LB/5:IOS) blend was titrated three different times with three different amounts of N58 to demonstrate the importance of adding the correct amount of a third surfactant to meet the HLB criteria mentioned in Example 1.

In a first batch, the 1% (5:LB/5:IOS) blend was titrated with N58 until the composition was free of cloudiness or precipitates. The resulting composition had 1% (5:LB/5:IOS) and 0.04% N58, generating an estimated ultra-low IFT of $2 \times 10^{-3}$ Dynes/cm. In a second batch, the resulting composition had 1% (5:LB/5:IOS) and 0.11% N58, generating an estimated IFT of $2 \times 10^{-2}$ Dynes/cm. In a third batch, the resulting composition had 1% (5:LB/5:IOS) and 0.3% N58, generating an estimated IFT of $3 \times 10^{-2}$ Dynes/cm.

Figure 10:
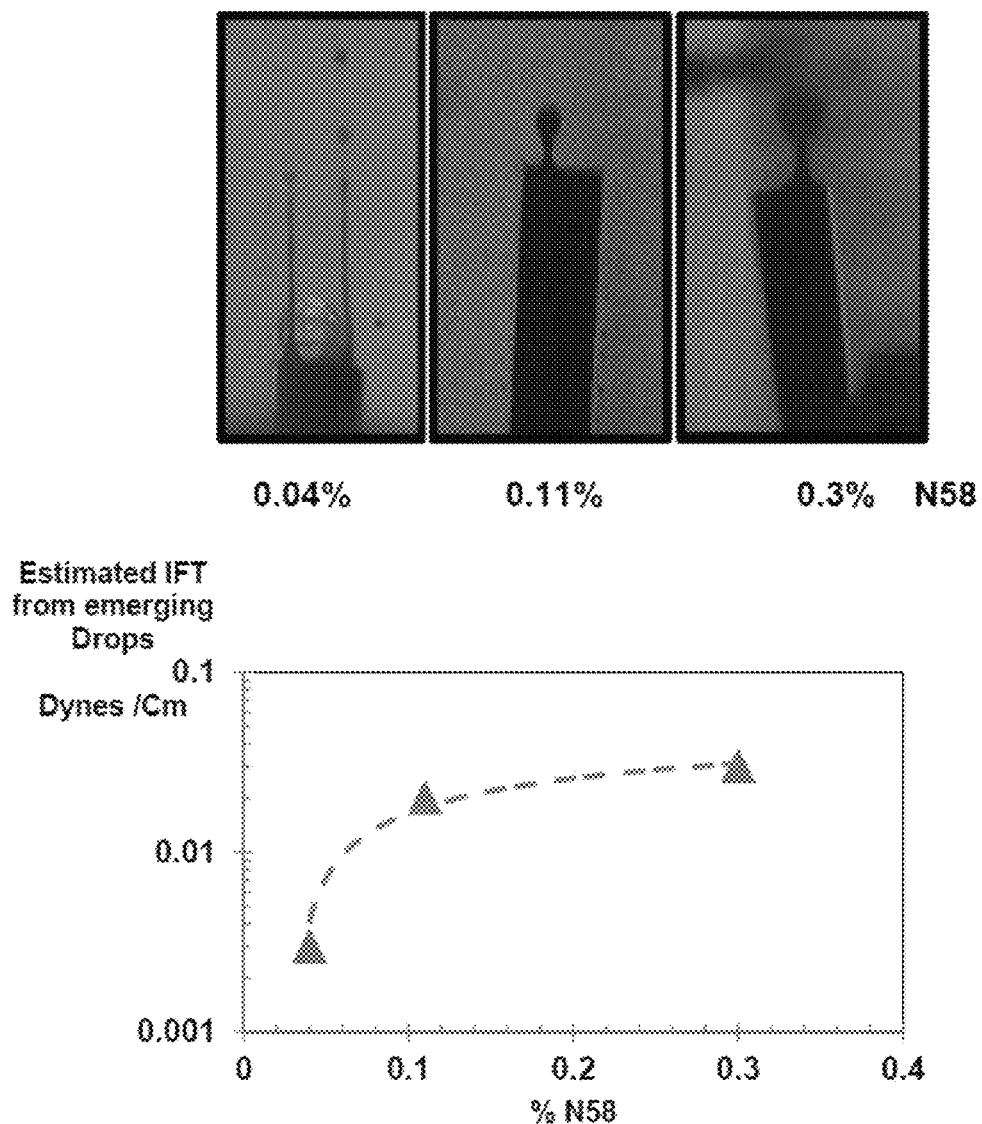
FIG. 10 provides an IFT comparison of initial emerging-drop behavior at 100° C. for different additions of N58.

The emerging drops at 100° C. left the oil-wet treated capillary filled with crude oil when immersed in corresponding formulations for the three batches. The results are depicted in FIG. 10. The IFT values, plotted as blue-closed triangles, increased when the N58 concentration was more than 0.04%.

The results indicate that, for generating ultra-low IFT, the amount of the third surfactant has to be just enough to produce a composition free of cloudiness or precipitates. Adding too much of the third surfactant makes the HLB in the system too hydrophilic for generating ultra-low IFT.

Example 4. Utilization of Formulated Compositions for Oil Recovery

Figure 11:
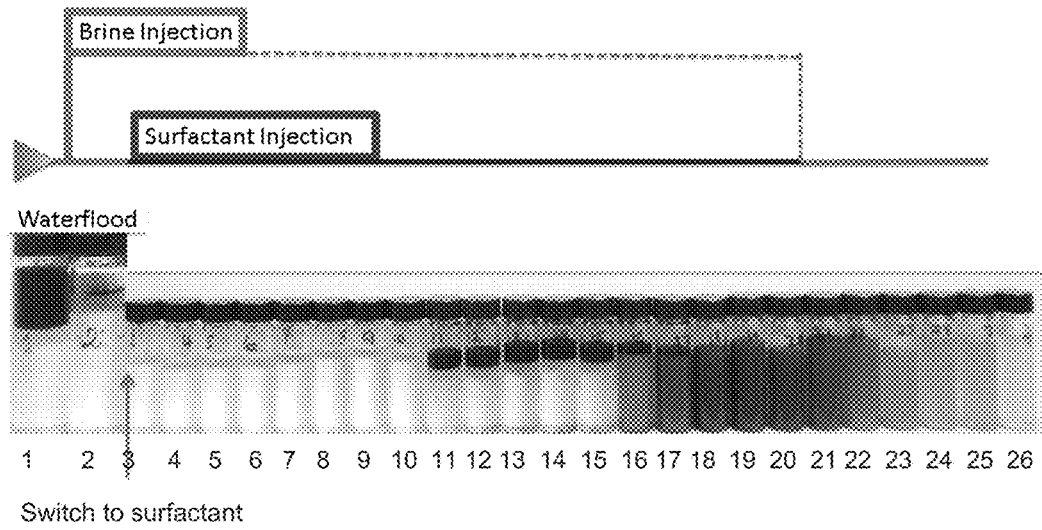
FIG. 11 provides a depiction of an experimental model for demonstrating that formulated compositions containing 1% (0.6:LB+0.4:$IOS_{15-18}$) and 0.3% L38 in test brine can be utilized in oil recovery processes.

In this example, Applicants demonstrate that formulated compositions containing 1% (0.6:LB+0.4:$IOS_{15-18}$) and 0.3% L38 in test brine can be utilized in oil recovery processes. The experimental model is depicted in FIG. 11, where vials are ordered in a sequence that corresponds to brine and surfactant injections (as shown). In this experiment, a 14.3 Darcy Dolomitic Sand Pack was water flooded until no more oil remained (samples 1-2). The residual 38% of tertiary oil that remained was recovered by continuously pumping 1.3% of a surfactant system (0.6-LB+0.4-$IOS_{15-18}$+0.3-ethoxylated carboxylate) at 110° C. (samples 11-26). The observed 'clean' banking of the oil in vials 11-15 is an indication of low water-oil interfacial tension generated by the formulated composition.

Figure 12:
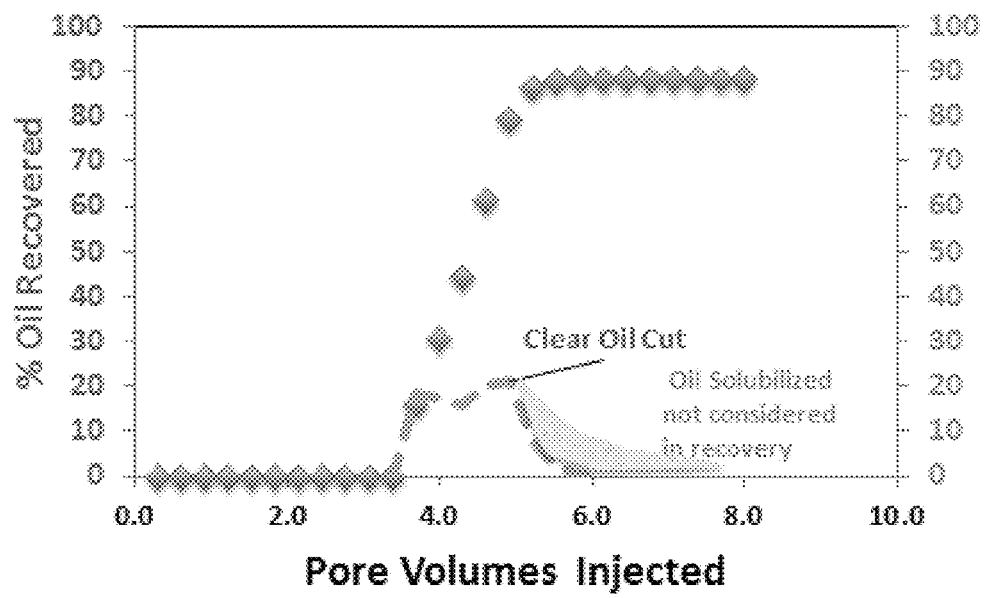
FIG. 12 provides a graph summarizing oil recovery test results obtained from the experimental model in FIG. 11.

The oil recovery test results are graphed in FIG. 12 as percent oil recovered versus pore volumes injected (PVI). Without being bound by theory, it is envisioned that the late oil breakthrough at about 3 PVI may be caused by excessive surfactant adsorption.

The results in this Example demonstrate that blends of LB with $IOS_{15-18}$ and $L_{38}$ appear to have potential for low-tension enhanced oil recovery applications at elevated temperatures.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A composition for enhanced oil recovery, said composition comprising:
    a first agent, wherein the first agent acts as a foam booster;
    a second agent, wherein the second agent comprises a sulfonated or sulfated anionic surfactant; a
    a third agent, wherein the third agent comprises an alkoxylated and anionic surfactant comprising one or more of the following surfactants:
        an alkoxylated and carboxylated alcohol, wherein the alcohol is linear or branched;
        an alkyl alkoxylated carboxylated surfactant, wherein the alkoxylated component is selected from the group consisting of propoxylated moieties, ethoxylated moieties, and combinations thereof; or
        combinations thereof; and
    a base liquid.

2. The composition of claim 1, further comprising a gas.

3. The composition of claim 2, wherein the gas is nitrogen.

4. The composition of claim 1, wherein the base liquid comprises brine.

5. The composition of claim 1, wherein the first agent is selected from the group consisting of alkanol amides, sultaines, betaines, amine oxides, zwitterionic surfactants, anionic surfactants, cationic surfactants, nonionic surfactants, alkyl ammonium chlorides, alcohols, fatty acids, and combinations thereof.

6. The composition of claim 1, wherein the first agent is lauryl betaine.

7. The composition of claim 1, wherein the second agent is selected from the group consisting of alkyl sulfonated surfactants, alkyl sulfated surfactants, alpha olefin sulfonated surfactants, internal olefin sulfonated surfactants, alkyl alkoxylated sulfonated surfactants, alkyl alkoxylated sulfated surfactants, and combinations thereof.

8. The composition of claim 1, wherein the second agent comprises an alpha olefin sulfonate.

9. The composition of claim 1, wherein the second agent is an internal olefin sulfonate surfactant.

* * * * *